(12) United States Patent
Durand

(10) Patent No.: US 9,164,756 B2
(45) Date of Patent: Oct. 20, 2015

(54) SOFTWARE UPDATING PROCESS FOR AN EMBEDDED DEVICE

(75) Inventor: Stéphane Durand, Meudon (FR)

(73) Assignee: GEMALTO SA, Meudon (FR)

( * ) Notice: Subject to any disclaimer, the term of this patent is extended or adjusted under 35 U.S.C. 154(b) by 237 days.

(21) Appl. No.: 13/883,883

(22) PCT Filed: Nov. 2, 2011

(86) PCT No.: PCT/EP2011/069233
§ 371 (c)(1),
(2), (4) Date: Oct. 4, 2013

(87) PCT Pub. No.: WO2012/062632
PCT Pub. Date: May 18, 2012

(65) Prior Publication Data
US 2014/0351569 A1    Nov. 27, 2014

(30) Foreign Application Priority Data
Nov. 8, 2010   (EP) .................................... 10306218

(51) Int. Cl.
*G06F 9/445*   (2006.01)
*G06F 11/14*   (2006.01)

(52) U.S. Cl.
CPC   *G06F 8/665* (2013.01); *G06F 8/65* (2013.01); *G06F 11/1433* (2013.01)

(58) Field of Classification Search
CPC ................................ G06F 8/665; G06F 9/4401
See application file for complete search history.

(56) References Cited

U.S. PATENT DOCUMENTS

| 5,701,492 | A | 12/1997 | Wadsworth |
| 7,089,549 | B2 * | 8/2006 | Venkiteswaran ............. 717/170 |
| 2005/0060528 | A1 | 3/2005 | Kim |
| 2007/0083744 | A1 * | 4/2007 | Seok ................................ 713/1 |
| 2008/0270685 | A1 * | 10/2008 | Kato ............................ 711/112 |
| 2010/0131694 | A1 | 5/2010 | Kelly |

OTHER PUBLICATIONS

PCT/EP2011/069233 International Search Report, Dec. 2, 2011, European Patent Office, P.B.5818 Patentlaan 2, NL—2280 HV Rijswijk.
PCT/EP2011/069233 Written Opinion of the International Searching Authority, Dec. 2, 2011, European Patent Office, P.B.5818 Patentlaan 2, NL—2280 HV Rijswijk.

* cited by examiner

*Primary Examiner* — Albert Wang
(74) *Attorney, Agent, or Firm* — The Jansson Firm; Pehr B. Jansson

(57) ABSTRACT

The invention relates to a method for updating software in an embedded device (1), said software being stored in an EEPROM memory (12) of the embedded device, the method comprising the steps of: c) executing an update management program code, this execution step comprising:—erasing the memory area storing the former software and storing at least an update instruction at the beginning of the memory area, the execution of this update instruction leading to an access to the update management program code;—the writing of the updated software in the erased memory area; d) deleting the update instruction so that the updated software is executed at startup.

11 Claims, 2 Drawing Sheets

SOFTWARE UPDATING PROCESS FOR AN EMBEDDED DEVICE

BACKGROUND

The present invention generally relates to a software update in an embedded device.

An embedded system is a specialized computer system, including both hardware and software, which forms a part of a larger system or machine. Furthermore, the larger system or machine may have a plurality of embedded systems. Typically, each of the embedded systems is housed on a single microprocessor board with firmware stored as object code within a non-volatile memory device.

The larger system or machine that generally utilizes the embedded system may include a wide variety of systems, ranging from telephones, to mass storage devices, to digital satellite receivers, and the like. The embedded systems commonly utilize software, among which firmware that provides an operating system managing the low level functions of the embedded system.

Typically, an embedded system provides for a code update process to support new features or to fix problems in the firmware (i.e., firmware upgrade). In many cases, the firmware upgrade will take the larger system or machine out of service for some period of time during which the firmware upgrade is performed.

To provide a firmware updating feature, the embedded system usually includes Flash memory to store the firmware. The firmware usually comprises both a bootloader and a main firmware stored in a boot sector of the Flash memory. The bootloader is placed at the first memory address of the Flash memory and is executed at boot-up time. The bootloader is utilized as failsafe firmware in case the main firmware is corrupted. The bootloader is executed at boot up time, in turn testing the integrity of the main firmware (preferably by computing a checksum and comparing it with a stored result or predetermined value) before the main firmware is actually executed. The bootloader may further diagnose whether the main firmware is corrupt and enable an update of a corrupt main firmware. If the bootloader does not detect an integrity error, it either branches the microprocessor on the first address of the main firmware or performs its loading. If the bootloader detects an integrity error, it can use an I/O interface to receive a main firmware replacement code. Alternatively, a backup main firmware may be provided so that a failed integrity test results in the execution of the backup main firmware.

In practice, some systems already in use may require an improved security level, like access cards or smartphones. Indeed, a known attack for bypassing the security features of the main firmware consists in changing the address of the main firmware recited in the bootloader program. A fake main firmware can thereby be executed by the system. The bootloader can also be attacked in order to download a fake main firmware update and trigger its execution.

There is thus a need for a convenient software updating process, that can be carried out by users during the life cycle of the system. The updating process can thereby fix some security issues during the life cycle of the system.

In the specific case of a bootloader updating process, as a system deprived of a valid bootloader can become unrecoverable, the bootloader updating process must be particularly safe.

SUMMARY

The invention thus relates to a method for updating software in an embedded device, said software being stored in an EEPROM memory of the embedded device, the method comprising the steps of:

c) executing an update management program code, this execution step comprising:
  erasing the memory area storing the former software and storing at least an update instruction at the beginning of the memory area, the execution of this update instruction leading to an access to the update management program code;
  the writing of the updated software in the erased memory area;

d) deleting the update instruction so that the updated software is executed at startup.

According to an embodiment, said software is the firmware of the embedded device, said firmware initially comprising a main firmware portion and a former bootloader portion stored in a bootloader storage area in order to be executed at startup of the embedded device and defining the location of the main firmware portion, the memory area erased at step c) being the bootloader area and the update instruction being stored at step c) so as to be executed at startup, the updated software written at step c) being an updated bootloader portion of the firmware.

According to another embodiment, the method further comprises, before steps c) and d), the steps of:

a) writing the update management program code in the memory at a location accessed during the execution of the former bootloader portion;

b) writing the updated bootloader portion in the memory at a location accessed during the execution of the update management program code.

According to another embodiment, the method comprises a step b') between steps a) and c), step b') comprising a restart of the embedded device.

According to a further embodiment, the update instruction stored at step c) is a jump instruction branching the execution to the update management program code.

According to a further embodiment, step d) comprises modifying the jump instruction for branching the execution to the updated software.

According to another embodiment, the modification of the jump instruction is carried out by an atomic writing operation.

According to an embodiment, the method further comprises a step of erasing the main firmware portion before step a), the update management program code being written at the location of the erased main firmware portion at step a).

According to another embodiment, the update management program code is written at a location subsequent to the bootloader storage area and the erasure of the bootloader storage area comprises the erasure of all the memory area preceding the update management program code.

According to a further embodiment, the method further comprises a step e) wherein the updated bootloader portion erases the update management program code and writes an updated main firmware portion at this erased location.

According to a further embodiment, the EEPROM memory comprises erasure and writing modes such that the smallest memory data unit erased in erasure mode is of greater size than the smallest memory data unit written in writing mode.

According to another embodiment, the erasure of the former bootloader portion comprises setting all the data words stored in the bootloader area to a same value, the embedded device comprising a microprocessor designed to handle these data words having this same value as neutral instructions.

BRIEF DESCRIPTION OF THE DRAWINGS

The advantage of the present invention will become apparent from the following description of several embodiments with reference to the accompanying drawings, in which.

DETAILED DESCRIPTION

Figure 1:
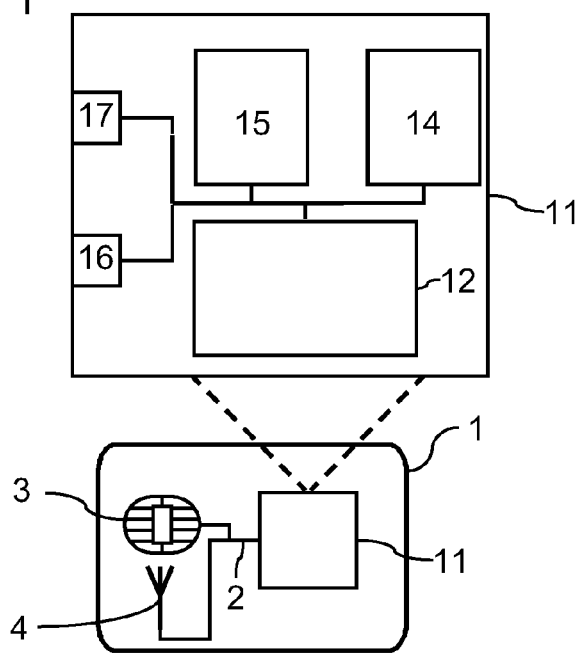
FIG. 1 is a schematic view of an embedded device for which the invention can be carried out.

FIG. 1 is a schematic view of an example of embedded device 1 for which the invention can be carried out. In this example, the embedded device 1 is an access smartcard used to remotely authenticate a user. The embedded device 1 includes a microcontroller 11. This microcontroller 11 includes a RAM memory 14, a non volatile EEPROM memory 12 and a microprocessor 15. The microcontroller 11 also includes a first Input/Output interface 17 and a second Input/Output interface 16. The I/O interface 17 is connected to a contact interface 3 of the smartcard. The contact interface 3 is adapted for a smartcard reader, for instance a USB communicating smartcard reader. Thus, the microcontroller 11 is able to communicate with other devices, for instance to carry out a transaction including an authentication. The I/O interface 16 is connected to an antenna 4. The antenna 4 is adapted to provide a contactless communication with other devices, for instance to carry out a transaction including an authentication. The antenna 4 may notably be adapted to communicate using a IEEE 802.11 protocol.

Figure 2:
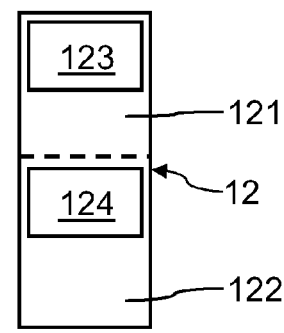
FIG. 2 is a schematic view of a non volatile memory area used to store a bootloader and a main firmware.

FIG. 2 is a schematic view of the EEPROM memory 12, for instance a Flash memory. Flash memories are commonly found in consumer electronic products. Flash memory is valued in many applications as a storage media due to its fast access speeds, low-power and nonvolatile operation. The EEPROM memory 12 comprises a bootloader storage area 121 and a main firmware storage area 122. The EEPROM memory 12 stores the firmware in charge of managing the low level features of the microcontroller 11. The firmware comprises a bootloader portion 123 stored in area 121 and a main firmware portion 124 stored in area 122. The size of the EEPROM memory 12 can typically be about 400 kB. Obviously, different memory sizes can also be used without departing from the teaching of the invention.

The bootloader portion 123 is intended to be the first software executed by the microprocessor 15 at startup. The bootloader portion 123 defines at which address the main firmware is stored in the EEPROM 12. The bootloader portion 123 also comprises features for checking the integrity of the main firmware portion 124. The bootloader portion 123 is notably in charge of updating the main firmware portion 124 in case an integrity failure is detected. The bootloader storage area 121 can have a bigger storage capacity than the size of the stored bootloader portion 123.

According to the invention, the bootloader storage area 121 can either store a bootloader portion loaded during the manufacturing process of the smartcard 1, or a bootloader portion loaded into the smartcard 1 during its lifecycle.

The EEPROM memory 12 includes an array of data blocks. A data block is defined as the smallest storage area that can be independently erased. A page defines the smallest unit that can be written in the Flash memory in a single operation. The page size thus defines the writing granularity of the Flash memory. These access characteristics of the Flash memory induce management difficulties. The bootloader storage area 121 comprises one or more blocks. The main firmware storage area 122 comprises one or more blocks.

If EEPROM memory 12 is of the Flash type, it only allows two storage states: erased and non-erased. In the erased state, a byte can be either all ones (0xFF) or all zeroes (0x00) depending on the flash device. In the example, an erased byte contains 0xFF. During a writing operation, one or more bits are set to 0. A bit of data may only be written when it is initially in an erase state. After it is written to, the bit cannot be written to before it is erased. In order to return the bit to its erase state, a whole data block must be erased. Flash technology does not allow the toggling of individual bits or bytes from a non-erased state back to an erased state.

Among the various types of flash memories, the Flash memories are commonly found in embedded systems. A Flash memory is organized into fixed-size pages (for example 512 bytes per page) and a number of pages constitutes a block (for example 32 pages per block). With some kinds of Flash memories like NOR-Flash memory, the page size can be as small as a word.

The aim of the invention is to safely replace former software by updated software in an embedded device. Such software replacement can be conveniently performed by a user in order to fix bugs of former software or to enhance its security features, throughout the life cycle of the embedded device.

In the specific case of a bootloader updating process, the updating method according to the invention guarantees that a sudden power interruption will not make an embedded device unusable, even if the interruption happens after the former bootloader is erased and before the updated bootloader is successfully activated. An embedded device could notably become unusable if a tearing was to occur during the writing of the bootloader into the EEPROM and if this incomplete bootloader could not be executed at the next startup.

Figure 3:
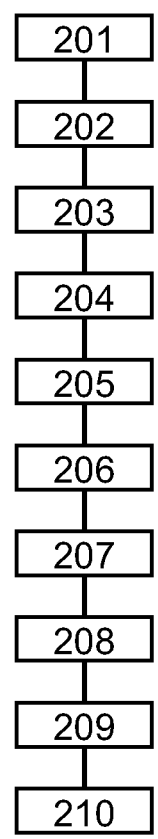
FIG. 3 illustrates the steps carried out according to an embodiment of the invention.

FIG. 3 is a block diagram reciting the steps performed by a method according to an embodiment of the invention.

At step 201, the embedded device 1 is located in an environment where it can communicate with external devices. The embedded device 1 stores a former bootloader in its EEPROM memory 12. A bootloader update is requested by the end user through an external device or triggered by the embedded device 1 itself. The embedded device 1 is restarted and the former bootloader is executed by the microprocessor 15.

At step 202, the former bootloader erases the data blocks containing the former main firmware portion of the embedded device 1, say the data blocks of the main firmware storage area 122.

At step 203, the former bootloader loads an update management program code in the EEPROM memory 12. The update management program code is for instance stored in the main firmware storage area 122, in the data blocks erased at step 202. Advantageously, the execution address of the update management program code is identical to the execution address of the former main firmware portion. The beginning of the main firmware storage area 122 is advantageously the data block next to the bootloader storage area 121.

At step 204, an updated bootloader is loaded into the EEPROM memory 12, for instance in the main firmware storage area 122, next to the update management program code. The updated bootloader can be stored in the erased data blocks, for instance next to the update management program code. This updated bootloader is in a non bootable form. The address of this updated bootloader is written in the update management program code so as to be accessible by this update management program code at a later stage.

At step 205, the embedded device 1 is for instance restarted. The former bootloader is still executed at first. After it has performed a successful integrity check of the update management program code, it triggers the execution of this update management program code. The management of the embedded device 1 is thus handed over to the update management program code.

At step 206, the update management program code erases all the data blocks preceding it, say all the data blocks of the bootloader storage area 121. The former bootloader is thereby erased and thus unusable.

At step 207, the update management program code stores an update instruction to be executed at startup in the bootloader area. For instance, the update management program code writes a jump instruction to its own address, in the first memory location of the bootloader storage area 121. When read, the jump instruction branches the execution to the update management program code.

At step 208, the update management program code copies the updated bootloader into the bootloader storage area 121. The jump to the update management program code remains stored up to the end of the copy of the updated bootloader.

At step 209, the update management program code ends the copy of the updated bootloader in the bootloader storage area 121. It performs an integrity check on the copied updated bootloader to confirm this updated bootloader can be safely executed. The update management program code then modifies the jump instruction that includes its own address. This jump instruction is modified, preferably by an atomic writing operation, into an instruction branching the execution to the updated bootloader at first at the next startup. The jump instruction can be either modified to recite the address of the beginning of the updated bootloader or modified as a neutral instruction, followed by the updated bootloader itself.

At step 210, the embedded device 1 is restarted and the updated bootloader is executed. The updated bootloader advantageously installs an updated main firmware portion in the main firmware storage area 122. The updated bootloader firstly erases the data block(s) storing the update management program code. The updated bootloader then writes the updated main firmware portion in the erased data blocks, and stores the memory address of the updated main firmware portion.

The safety of the method will now be demonstrated by analyzing the incidence of a tearing at each step.

If a tearing takes place at step 202, the former bootloader remains operative. At startup, the former bootloader is executed and can successfully perform the erasure of the former main firmware portion.

If a tearing takes place at step 203, the former bootloader detects an integrity error in the loaded update management program code. At startup, the former bootloader is executed and can successfully perform the loading of the update management program code.

If a tearing takes place at step 204, the former bootloader detects an integrity error in the loaded updated bootloader. At startup, the former bootloader is executed and can successfully perform the loading of the updated bootloader into the EEPROM memory 12. The operation where the address of the updated bootloader is written in the update management program code can be atomic, such that there is no risk of storing an inconsistent address further to a tearing.

If a tearing takes place at step 205, the former bootloader is first executed at the next start and then hands the management of the embedded device 1 over to the update management program code. The update of the bootloader is thereby resumed.

If a tearing takes place at step 206, the data blocks of the former bootloader are either erased or remains unchanged, due to the atomic nature of a data block erasure step. If the erasure was not successfully performed, the former bootloader will be executed again at the next start and the update management program code will perform the erasure step once again.

In case the data blocks were successfully erased, all the data words stored therein have a same value. The microprocessor 15 advantageously handles such data words as neutral instructions: once executed, a neutral instruction does not interrupt the execution of the microprocessor 15 or does not modify its execution flow. The microprocessor steps over that instruction and executes the next instruction. This can be either an undefined instruction that does not trigger a microprocessor exception, or a basic instruction (for instance copying a register value into itself) leading the microprocessor 15 to automatically execute the next stored instruction. If a tearing takes place once the former bootloader data blocks are erased, at the next start, a neutral instruction is read at the first address of the bootloader storage portion. The microprocessor 15 then executes the next neutral instructions of the bootloader storage portion, until he reaches the start instruction of the update management program code. Then, the update management program code is executed, leading to the update of the bootloader portion. Thus, even if the address of the update management program code could not be stored in the bootloader storage portion further to a tearing, the update management program code can still be accessed and executed by the microprocessor 15.

At step 207, the writing of the jump instruction to the address of the update management program code in the bootloader area is advantageously atomic, in order to provide a safety guarantee. Thus, this writing operation is not affected by a tearing. The jump instruction forms an update instruction, providing an access to the update management program code without requesting an execution of all the neutral instructions stored in the erased bootloader storage area. Another kind of branching instruction can be used as an update instruction instead of a jump instruction.

If a tearing occurs at step 208 up to the modification of the jump instruction, the jump instruction is first read and the update management program code is executed at the next start. The update management program code then resumes the copy of the updated bootloader into the bootloader storage area 121.

The update instruction may be formed of a jump code comprising several instructions and ending by the jump instruction. In such a case, the first instructions of the jump code are initially written into the bootloader storing area 121 and the jump instruction is written in an atomic last writing operation.

Unlike what someone skilled in the art might have designed, the erasing and writing operations of the bootloader storing area 121 are timely offset, which in fact provides a bootloader updating safety.

The microcontroller 11 can notably include a microprocessor 15 commercially distributed under the ARM7 reference.

The following instructions may be stored in the bootloader storage area 121 at step 207:
@0x00: LDR PC, 0x000AAA00BB
(This instruction stores the address in the current registry)
@x01: JUMP 0x000AAA00BB
(This instruction is a jump instruction branching the execution to address 0x000AAA00BB)

Advantageously, the AAA part of the address constitutes an address offset between the updated bootloader and the update management program code. This means that the address of the updated bootloader can be set as 0x00000000BB. Using such an offset, the address stored at 0xYY can be easily modified at step 209 to point on the updated bootloader instead of the update management program code. The 1 values included in the address offset are simply set to 0 values by a writing operation.

Though the invention was disclosed in its application to a bootloader updating process, the invention also applies to an updating process of any other kind of software stored in EEPROM memory.

The invention claimed is:

1. A method for updating software in an embedded device (1), said software being stored in an EEPROM memory (12) of the embedded device and said software comprising a bootloader portion, the method comprising the steps of:
   c) executing an update management program code, this execution step comprising:
      erasing a memory area storing a former bootloader portion of the software and storing at least a jump instruction at the beginning of said erased memory area, the execution of the jump instruction branching the execution of an update management program code;
      writing of an updated bootloader portion of the software in the erased memory area;
   d) deleting the jump instruction so that the updated bootloader portion of the software is executed at startup.

2. The method for updating software according to claim 1, wherein said software is the firmware of the embedded device, said firmware initially comprising a main firmware portion (124) stored in a main firmware storage area of the EEPROM memory and a former bootloader portion (123) stored in a bootloader storage area (121) of the EEPROM memory in order to be executed at startup of the embedded device and defining the location of the main firmware portion, the memory area erased at step c) being the bootloader area and the jump instruction being stored at step c) so as to be executed at startup, the updated software written at step c) being an updated bootloader portion of the firmware.

3. The method for updating software according to claim 2, further comprising, before steps c) and d), the steps of:
   a) loading the update management program code in the main firmware storage area at a location accessed during the execution of the former bootloader portion;
   b) loading the updated bootloader portion in the main firmware storage area at a location accessed during the execution of the update management program code.

4. The method according to claim 3, further comprising a step b') between steps a) and c), step b') comprising a restart of the embedded device.

5. The method according to claim 3, wherein the method further comprises a step of erasing the main firmware portion (124) before step a), the update management program code being written at the location of the erased main firmware portion at step a).

6. The method according to claim 5, wherein the update management program code is written in the main firmware storage area at a location subsequent to the bootloader storage area (121) and wherein the erasure of the bootloader storage area comprises the erasure of all the memory area preceding the update management program code.

7. The method according to claim 5, further comprising a step e) wherein the updated bootloader portion erases the update management program code and writes an updated main firmware portion at this erased location.

8. The method according to claim 1, wherein step d) comprises modifying the jump instruction for branching the execution to the updated bootloader portion of the software.

9. The method according to claim 8, wherein the modification of the jump instruction is carried out by an atomic writing operation.

10. The method according to claim 1, wherein the EEPROM memory (12) comprises erasure and writing modes such that the smallest memory data unit erased in erasure mode is of greater size than the smallest memory data unit written in writing mode.

11. The method according to claim 2 or 10, wherein the erasure of the former bootloader portion comprises setting all the data words stored in the bootloader area (121) to a same value, the embedded device (1) comprising a microprocessor (15) designed to handle these data words having this same value as neutral instructions.

* * * * *